(12) United States Patent
Kato et al.

(10) Patent No.: US 9,122,961 B2
(45) Date of Patent: Sep. 1, 2015

(54) PRINTED IMAGE INSPECTING APPARATUS AND PRINTED IMAGE INSPECTING METHOD

(71) Applicant: DAINIPPON SCREEN MFG. CO., LTD, Kyoto-shi, Kyoto (JP)

(72) Inventors: Tomotaka Kato, Kyoto (JP); Atsushi Imamura, Kyoto (JP); Shiro Koike, Kyoto (JP); Toshiriro Sato, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 14/374,154

(22) PCT Filed: Jan. 25, 2013

(86) PCT No.: PCT/JP2013/000382
§ 371 (c)(1),
(2) Date: Jul. 23, 2014

(87) PCT Pub. No.: WO2013/114838
PCT Pub. Date: Aug. 8, 2013

(65) Prior Publication Data
US 2015/0002887 A1    Jan. 1, 2015

(30) Foreign Application Priority Data

Feb. 3, 2012  (JP) ................................. 2012-022068

(51) Int. Cl.
*G06K 15/00*  (2006.01)
*G06K 15/02*  (2006.01)
(Continued)

(52) U.S. Cl.
CPC . *G06K 15/02* (2013.01); *B41J 3/60* (2013.01); *H04N 1/4095* (2013.01)

(58) Field of Classification Search
CPC ..... G06K 9/00442; G06K 9/033; G06K 9/38; H04N 1/4095; H04N 7/18; H04N 1/00488; H04N 1/0049
USPC ................................ 358/1.1–3.29, 1.11–1.18
See application file for complete search history.

(56) References Cited

U.S. PATENT DOCUMENTS

2003/0218781 A1    11/2003  Suino
2007/0291071 A1*   12/2007  Nakazawa et al. .............. 347/21
(Continued)

FOREIGN PATENT DOCUMENTS

EP        1154634 A2    11/2001
JP     2009-000930 A    1/2009
(Continued)

OTHER PUBLICATIONS

International Search Report issued in International Application No. PCT/JP2013/000382 mailed Mar. 5, 2013, with English translation.
(Continued)

*Primary Examiner* — Marcellus Augustin
(74) *Attorney, Agent, or Firm* — McDermott Will & Emery LLP (57) ABSTRACT

A mask generating unit generates a show-through area mask in accordance with inverted front printed image data, obtained by inverting front printed image data in a horizontal direction, and back printed image data. Then, a determining unit inspects a show-through area of the back inspecting image data corresponding to the show-through area mask with a show-through inspection threshold. Consequently, an area where the show-through exists with high possibility is inspected with the looser show-through inspection threshold. This achieves suppression of determination error due to the show-through. On the other hand, an area where no show-through exists with high possibility is inspected with a tight normal inspection threshold. This achieves accurate determination of printing error. As a result, accurate printing inspection is obtainable even to web paper with the show-through.

10 Claims, 5 Drawing Sheets (51) Int. Cl.
  *B41J 3/60* (2006.01)
  *H04N 1/409* (2006.01)

(56) References Cited

U.S. PATENT DOCUMENTS

2009/0161124 A1  6/2009  Tamura
2009/0262402 A1* 10/2009  Fan et al. .................... 358/488
2011/0116110 A1  5/2011  Roof et al.

FOREIGN PATENT DOCUMENTS

JP  2009-025374 A  2/2009
JP  4265421 B2  5/2009

OTHER PUBLICATIONS

European Search Report issued in European Application No. 13742985.8-1903 dated Oct. 31, 2014.

* cited by examiner

PRINTED IMAGE INSPECTING APPARATUS AND PRINTED IMAGE INSPECTING METHOD

RELATED APPLICATIONS

This application is the U.S. National Phase under 35 U.S.C. §371 of International Application No. PCT/JP2013/000382, filed on Jan. 25, 2013, which in turn claims the benefit of Japanese Application No. 2012-022068, filed on Feb. 3, 2012, the disclosures of which are incorporated by reference herein.

TECHNICAL FIELD

The present invention relates to a printed image inspecting apparatus and a printed image inspecting method for inspecting a printing sheet with printed images on both faces thereof.

BACKGROUND ART

Examples of such a conventional apparatus includes a printer, a reader, a show-through image data generating unit, a corrected back inspecting image data generating unit, and a determining unit. The printer performs printing to a front face of a printing sheet in response to data on an original front image, and performs printing on a back face of the printing sheet in response to data on an original back image. The reader reads out the front and back images of the printing sheet from the printer to obtain front inspecting image data and back inspecting image data, respectively. The show-through image data generating unit corrects shading of the front inspecting image data obtained by the reader in accordance with transmittance of the printing sheet after performing the printing on the front face and before performing the printing on the back face, and inverting the front image to generate show-through image data. The corrected back inspecting image data generating unit subtracts the show-through image data from the back inspecting image data obtained by the reader to generate corrected back inspecting image data. The determining unit collates the original back image data with the corrected back inspecting image data to determine quality of the printing on the back face. See, for example, Japanese Patent Publication No. 4265421A.

PATENT LITERATURE

Japanese Patent Publication No. 4265421A

SUMMARY

Technical Problem

However, the example of the conventional apparatus with such a construction has the following problems. Specifically, the conventional apparatus determines printing quality by collating the original back image data with the corrected back inspecting image data. Accordingly, inaccurate corrected back inspecting image data causes reduced accuracy for determining the printing quality. Such a problem may arise. The show-through image data is obtained by processing the front inspecting image data. Here, the front inspecting image data is obtained with an optical system different from that for the back inspecting image data. Consequently, optical distortion may possibly lead to incorrect alignment of the show-through image data from the front inspecting image data with the back inspecting image data. This may cause incorrect corrected rear face inspection image data.

In addition, when the original back image data is collated with the corrected back inspecting image data, subtraction is made between pixels in positions corresponding to each other in the data, and then it is determined for quality whether or not the resultant exceeds an inspection threshold set in advance. Consequently, an area without show-through and an area with show-through are determined with an equal inspection threshold. This may provide misinformation causing failure in determining the quality. Such a problem may also arise.

The present invention has been made regarding the state of the art noted above, and its one object is to provide a printed image inspecting apparatus and a printed image inspecting method that allow accurate printing inspection to even a double-faced printing sheet with show-through.

Solution to Problem

The present invention is constituted as stated below to achieve the above object. One aspect of the present invention discloses a printed image inspecting apparatus for reading out a printed image on a printing sheet in accordance with printed image data to inspect a printing result of the printing sheet. The apparatus includes a reader configured to read front and back faces of the printing sheet to obtain front inspecting image data and back inspecting image data, respectively; a mask generating unit configured to generate a show-through area mask, representing an area where show-through possibly exists, in accordance with inverted front printed image data and the back printed image data, the inverted front printed image data being obtained by inverting the front printed image data in a horizontal direction; and a determining unit configured to inspect a show-through area of the back inspecting image data corresponding to the show-through area mask with a show-through inspection threshold.

Operation and Effect

With the aspect of the present invention, the mask generating unit generates the show-through area mask in accordance with the inverted front printed image data obtained by inverting the front printed image data in the horizontal direction and the back printed image data. The show-through area mask represents an area where show-through of the printed image of the front printed image data may exist on the back face of the printing sheet. The determining unit inspects the show-through area corresponding to the show-through area mask with the "show-through inspection threshold" upon inspecting the back inspecting image data. Consequently, inspection is performed to an area where the show-through may possibly exist with a looser show-through inspection threshold. This achieves suppression of determination error due to the show-through. As a result, accurate printing inspection can be performed to the printing sheet with the show-through.

Here, the "show-through inspection threshold" in the present invention is a threshold higher (looser) than a normal inspection threshold used for inspecting an area with no show-through.

Moreover, the mask generating unit in the present invention preferably generates the show-through area mask by aligning the inverted front printed image data with the back printed image data. Such is preferable.

The mask generating unit generates the show-through area mask with no use of the front and back inspecting image data via the optical system. Accordingly, almost no error occurs due to distortion of the optical system, and thus accurate front and back alignment is obtainable. Consequently, the show-through area in the show-through area mask can be set accurately.

Moreover, the mask generating unit of the present invention generates a pure show-through area mask by removing an image area of the back printed image data from the inverted front printed image data, and thickening process is performed to the pure show-through area mask, and a resultant mask is used as the show-through area mask. Such is preferable.

In the double-faced printing, slight deviation may occur between the front and back of the printing sheet. Then, the mask generating unit performs the thickening process to the pure show-through area mask, and a resultant mask is adopted as the show-through area mask. This allows absorption of the deviation.

Moreover, another aspect of the present invention discloses a printed image inspecting method for reading out a printed image on a printing sheet in accordance with printed image data and inspecting a printing result on the printing sheet. The method includes a data obtaining step of reading a back face of the printing sheet after printing a front face of the printing sheet in accordance with front printed image data and after printing the back face of the printing sheet in accordance with back printed image data, thereby obtaining back inspecting image data; a mask generating step of generating a show-through area mask, representing an area where show-through possibly exists, in accordance with inverted front printed image data and the back printed image data, the inverted front printed image data being obtained by inverting the front printed image data in a horizontal direction; and a determining step of inspecting a show-through area of the back inspecting image data corresponding to the show-through area mask with a show-through inspection threshold.

Operation and Effect

With the aspect of the present invention, the back face of the printing sheet is read out to obtain the back inspecting image data in the data obtaining step. Then, in the mask generating step, the show-through area mask, representing the area where the show-through possibly exists, is generated in accordance with the inverted front printed image data and the back printed image data, the inverted front printed image data being obtained by inverting the front printed image data in the horizontal direction. Thereafter, in the determining step, the show-through area corresponding to the show-through area mask is inspected with the "show-through inspection threshold". Consequently, the area where the show-through possibly exists with high possibility is inspected with the looser show-through inspection threshold. This achieves suppression of determination error due to the show-through. As a result, accurate printing inspection is obtainable to the printing sheet with the show-through.

Here, the "show-through inspection threshold" in the present invention is a threshold higher (looser) than a normal inspection threshold used for inspecting an area with no show-through.

Moreover, the mask generating step of the present invention includes aligning the inverted front printed image data with the back printed image data to generate the show-through area mask. Such is preferable.

The mask generating unit generates the show-through area mask with no use of the front and back inspecting image data via the optical system. Accordingly, almost no error occurs due to distortion of the optical system, and thus accurate front and back alignment is obtainable. Consequently, the show-through area in the show-through area mask can be set accurately.

Moreover, the mask generating step of the present invention includes removing an image area in the back printed image data from the inverted front printed image data to generate a pure show-through area mask, and then performing thickening process to expand the pure show-through area mask outwardly, and a resultant mask is adopted as the show-through area mask. Such is preferable.

In the double-faced printing, slight deviation may occur between the front and back faces of the printing sheet. Then, the mask generating unit performs the thickening process to the pure show-through area mask, and the resultant mask is adopted as the show-through area mask. This allows absorption of the deviation.

Advantageous Effects of Invention

In the printed image inspecting apparatus of the present invention, the mask generating unit generates the show-through area mask in accordance with the inverted front printed image data, obtained by inverting the front printed image data in the horizontal direction, and the back printed image data. Then, the determining unit inspects the show-through area of the back inspecting image data corresponding to the show-through area mask with the show-through inspection threshold. Consequently, an area where the show-through possibly exists with high possibility is inspected with the looser show-through inspection threshold. This achieves suppression of determination error due to the show-through. On the other hand, an area where no show-through possibly exists with high possibility is inspected with a tight normal inspection threshold. This achieves accurate determination of the printing error. As a result, accurate printing inspection is obtainable even to web paper with the show-through.

DESCRIPTION OF EMBODIMENTS

Figure 1:
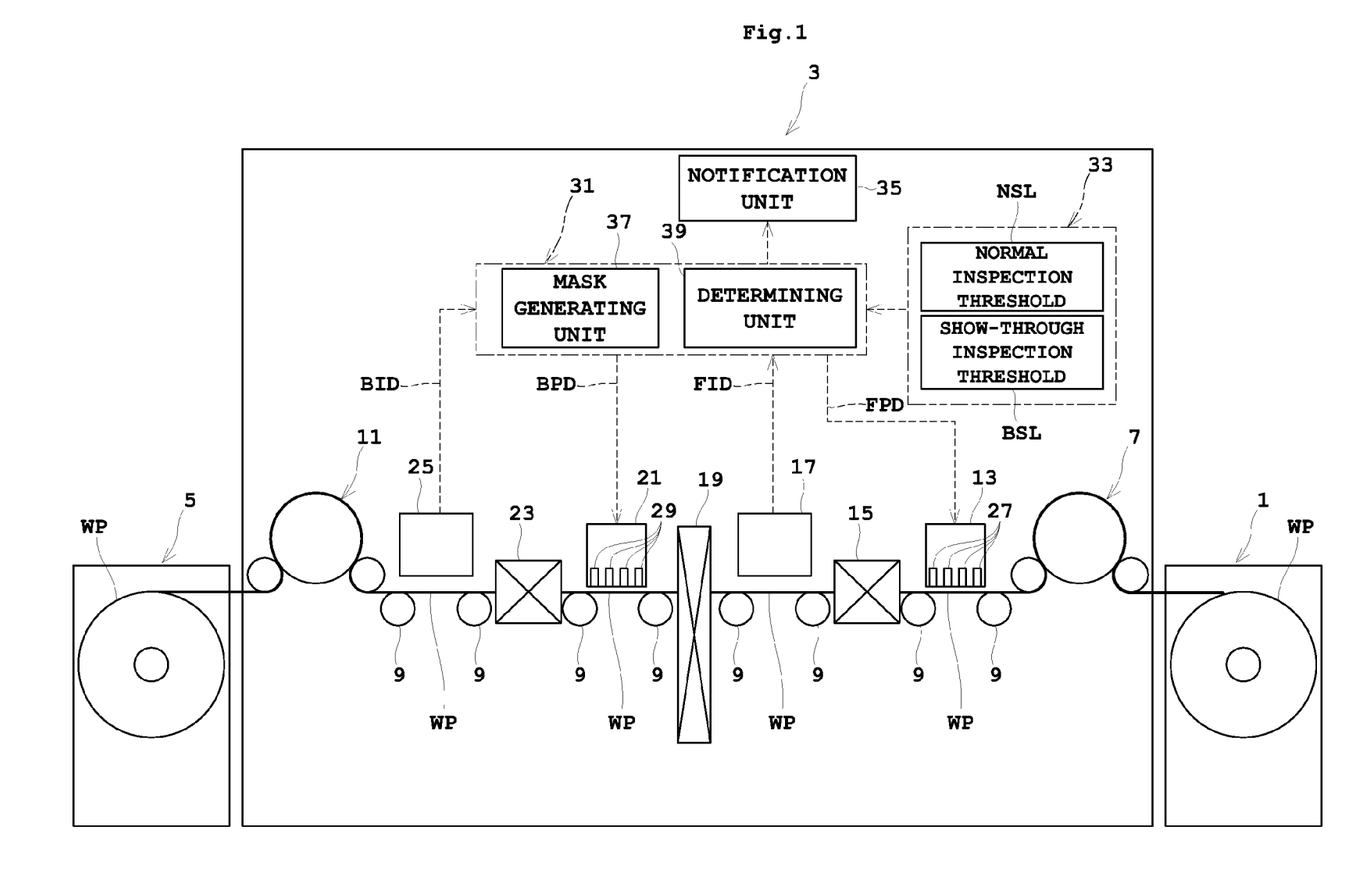
FIG. 1 is a schematic view illustrating an entire construction of an inkjet printing system according to one embodiment of the present invention.

Description will be given hereinunder of one embodiment of the present invention with reference to drawings. FIG. 1 is a schematic view illustrating an entire inkjet printing system according to one embodiment of the present invention.

An inkjet printing system according to the embodiment includes a paper feeder 1, an inkjet printing apparatus 3, and a take-up roller 5.

The paper feeder 1 holds web paper WP in a roll form to be rotatable about a horizontal axis, and unwinds and feeds out the web paper WP to the inkjet printing apparatus 3. The inkjet printing apparatus 3 performs printing to the web paper WP. The paper take-up roller 5 winds up the web paper WP printed by the inkjet printing apparatus 3 about a horizontal axis. Regarding the side from which the web paper WP is fed as upstream and the side to which the web paper WP is discharged as downstream, the paper feeder 1 is disposed upstream of the inkjet printing apparatus 3 whereas the take-up roller 5 is disposed downstream of the inkjet printing apparatus 3.

The inkjet printing apparatus 3 includes a drive roller 7 in an upstream position thereof. The drive roller 7 takes the web paper WP from the paper feeder 1. The web paper WP unwound from the paper feeder 1 by the drive roller 7 is transported downstream toward the take-up roller 5 on a plurality of transport rollers 9. A drive roller 11 is disposed between the most downstream transport roller 9 and the take-up roller 5. The drive roller 11 feeds out the web paper WP travelling on the transport rollers 9 toward the take-up roller 5.

The inkjet printing apparatus 3 includes a front-face printing unit 13, a front-face drying unit 15, a front-face inspecting unit 17, an inversion unit 19, a back-face printing unit 21, a back-face drying unit 23, and a back-face inspecting unit 25, in this order, between the drive rollers 7 and 11. Here, the terms "front face" and "back face" in the embodiment represent a printing face of the web paper WP to which primary printing is performed, and a printing face of the web paper WP to which secondary printing is performed, respectively.

The front-face printing unit 13 has printing heads 19 for discharging ink droplets. The front-face printing unit 13 typically includes a plurality of printing heads arranged in a transport direction of the web paper WP. For instance, four printing units 13 are provided separately for black (K), cyan (C), magenta (M), and yellow (Y). However, in order to facilitate understanding of the present invention, the embodiment is to be described on the assumption that only one printing unit 13 is provided. Here, a back-face printing unit 21 to be mentioned later is similar to this.

The front-face drying unit 15 dries the front face of the web paper WP having discharged ink droplets and thus a printed image. The front-face drying unit 15 includes a heat drum not shown. The heat drum contacts the back face of the web paper WP, thereby drying the ink droplets applied on the front face of the web paper WP.

The front-face inspecting unit 17 inspects the printed image on the front-face of the web paper WP for any stains or omissions. The front-face inspecting unit 17 includes a camera or an optical system. The front-face inspecting unit 17 images the web paper WP fed immediately therebelow, and outputs the result as front-face inspecting image data.

The inversion unit 19 inverts the web paper WP fed with the front-face thereof being directed upward. In other words, the web paper WP is inverted so as the back face thereof to be directed upward.

Similar to the front-face printing unit 13, the back-face printing unit 21 includes a printing head 29. The printing head 29 is same in construction as the printing head 27 of the front-face printing unit 13.

The back-face drying unit 23 has the same construction as the front-face drying unit 15, and dries the back face of the web paper WP. The back-face inspecting unit 25 has the same construction as the front-face inspecting unit 17, and inspects the back face of the web paper WP for any stains or omissions. Specifically, the back-face inspecting unit 25 includes a camera or an optical system. The back-face inspecting unit 25 images the web paper WP fed immediately therebelow, and outputs the result as back inspecting image data. The back-face inspecting unit 25 is to be mentioned later in detail.

Here, the front-face inspecting unit 17 and the back-face inspecting unit 25 correspond to the "reader" in the present invention.

The inkjet printing apparatus 3 further includes a controller 31, a memory unit 33, and a notification unit 35. The controller 31 receives the printed image data, corresponding to the image printed with the inkjet printing apparatus 3, from an external computer. The controller 31 performs operation to the drive rollers 7 and 11, the front-face printing unit 13, and the back-face printing unit 21 in accordance with printing of the front-face printed image data and the back printed image data. The notification unit 35 notifies abnormal printing when the controller 31 outputs an error through inspection process to be mentioned later.

The controller 31 further includes a mask generating unit 37, and a determining unit 39. The mask generating unit 37 generates a show-through area mask as follows. The show-through area mask is adopted upon inspecting the back-face inspecting image data as the printing result on the back face of the web paper WP. The determining unit 39 switches the inspection threshold within and without the show-through area mask to inspect a printing area (sheet) of the web paper WP. Specifically, inspection is made by selectively using a normal inspection threshold NSL in the memory unit 33 and a show-through inspection threshold BSL. Here, the normal inspection threshold NSL is set lower than the show-through inspection threshold BSL. In other words, the show-through inspection threshold BSL is looser than the normal inspection threshold NSL. In addition, the determining unit 39 inspects the front inspecting image data using only the normal inspection threshold NSL in the memory unit 33.

The front-face inspecting unit 17, the back-face inspecting unit 25, the mask generating unit 37, the determining unit 39, and the memory unit 33 correspond to the "printed image inspecting apparatus" in the present invention.

Figure 2:
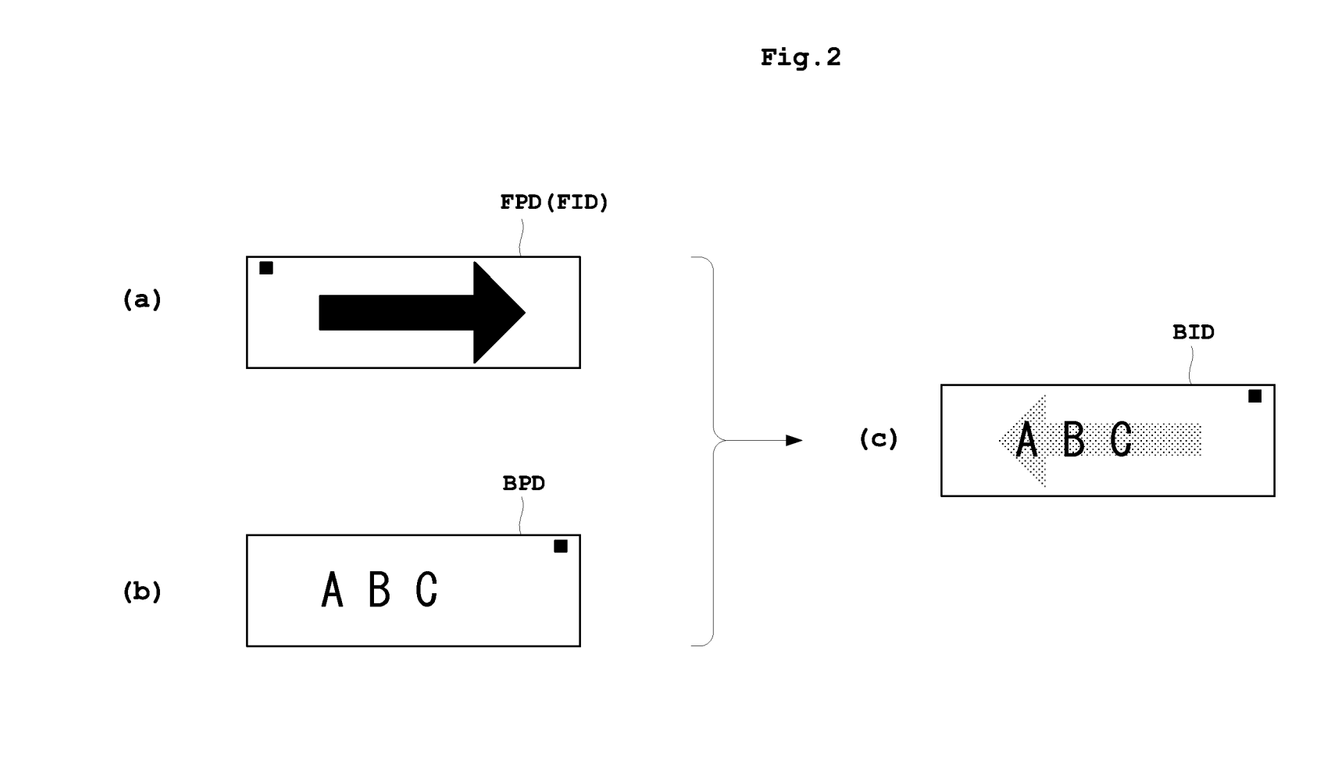
FIG. 2 is a schematic view illustrating one example of image data, FIG. 2(a) illustrating front printed image data, FIG. 2(b) illustrating back printed image data, and FIG. 2(c) illustrating back inspecting image data.

Now reference is made to FIG. 2. FIG. 2 is a schematic view illustrating one example of the image data. FIG. 2(a) illustrates the front-face printed image data. FIG. 2(b) illustrates the back-face printed image data. FIG. 2(c) illustrates the back inspecting image data.

FIG. 2(a) illustrates one example of front-face printed image data FPD with a rightward arrow that the controller 31 received from the external computer. The rectangular on the left of the front-face printed image data FPD is a front and back alignment mark. FIG. 2(b) illustrates one example of back-face printed image data BPD with letters A, B, and C of the alphabet that the controller 21 received from the external computer. The rectangular on the right of the back printed image data BPD is the alignment mark. The front inspecting image data FID obtained by the front-face inspecting unit 17 is almost same as that in FIG. 2(a), and thus illustration thereof is to be omitted. Moreover, the back inspecting image data BID as illustrated in FIG. 2(c) is obtained by the back-face inspecting unit 25. Specifically, when the web paper WP has high transmittance, the front printed image data FPD becomes transparent through the back inspecting image data BID, whereby show-through occurs. When the back inspecting image data BID is inspected under such a state as the inspection threshold is set tight, the back inspecting image data BID has errors in an area around the letters A, B, and C of the alphabet. Accordingly, the embodiment performs inspection by generating the following mask.

Figure 3:
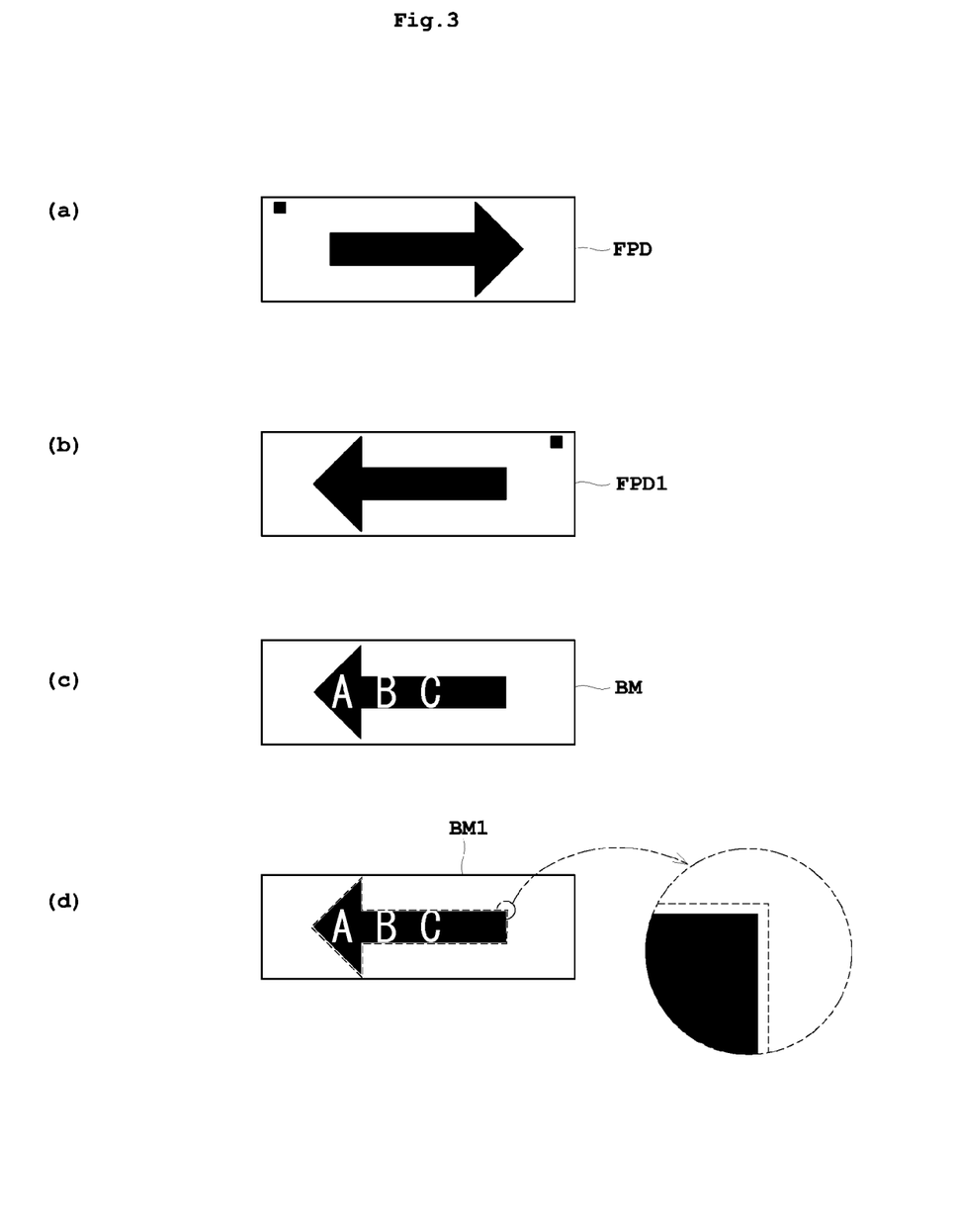
FIG. 3 is a schematic view illustrating one example of a step of generating a show-through area mask, FIG. 3(a) illustrating the front printed image data, FIG. 3(b) illustrating inverted front printed image data, FIG. 3(c) illustrating a pure show-through area mask, and FIG. 3(d) illustrating a show-through mask.
Figure 4:
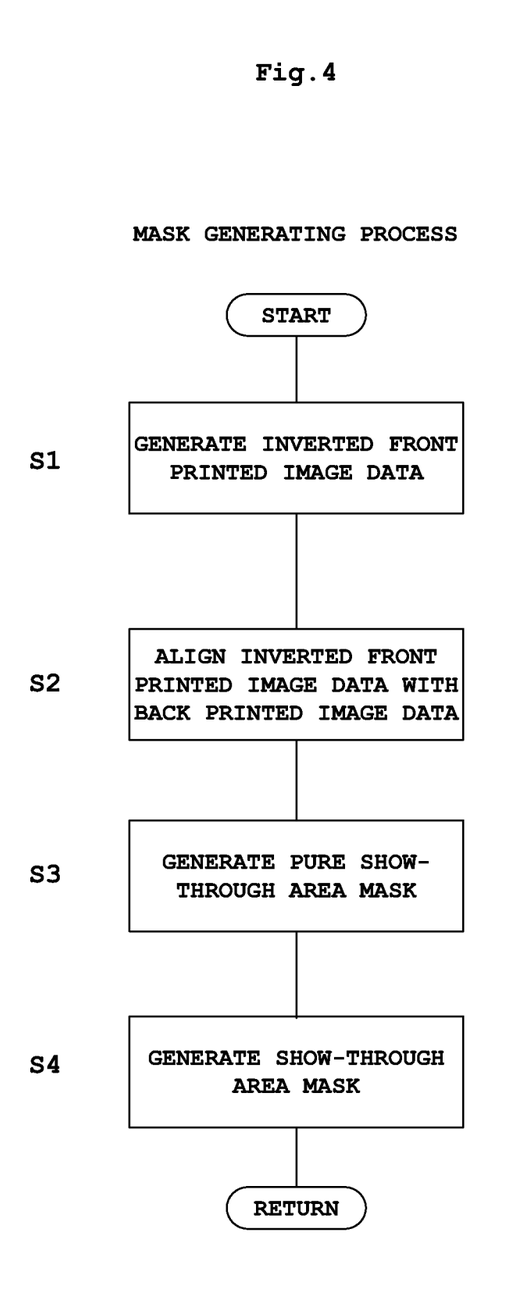
FIG. 4 is a flow chart illustrating a process of generating the show-through mask.

Now reference is made to FIGS. 3 and 4. FIG. 3 is a schematic view illustrating one example of generating a show-through area mask. FIG. 3(*a*) illustrates the front printed image data. FIG. 3(*b*) illustrates the inverted front printed image data. FIG. 3(*c*) illustrates a pure show-through area mask. FIG. 3(*d*) illustrates the show-through mask. FIG. 4 is a flow chart of generating the show-through mask.

The mask generating unit 37 inverts the front printed image data FPD (FIG. 3(*a*)), corresponding to the back printed image data BPD to be inspected, in the horizontal direction, thereby generating an inverted front printed image data FPD1 (FIG. 3(*b*), Step S1). Subsequently, the mask generating unit 37 aligns the inverted front printed image data FPD1 with the back printed image data BPD (Step S2). In addition, the mask generating unit 37 removes an image in the back printed image data BPD to generate a pure show-through area mask BM (FIG. 3(*c*), Step S3). Subsequently, the mask generating unit 37 performs "thickening process" to the image in the pure show-through area mask BM outwardly to generate a show-through area mask BM1 (FIG. 3(*d*), Step S4). The thickening process achieves outward expansion of the image in the pure show-through area mask BM entirely by given pixels. The given pixels may be set appropriately in accordance with accuracy of the front and back alignment by the front-face printing unit 13 and the back-face printing unit 21.

As mentioned above, the show-through area mask BM1 generated by the mask generating unit 37 represents that a position of the image (a black area) corresponds to an area where the show-through in the front printed image data FPD influences.

Figure 5:
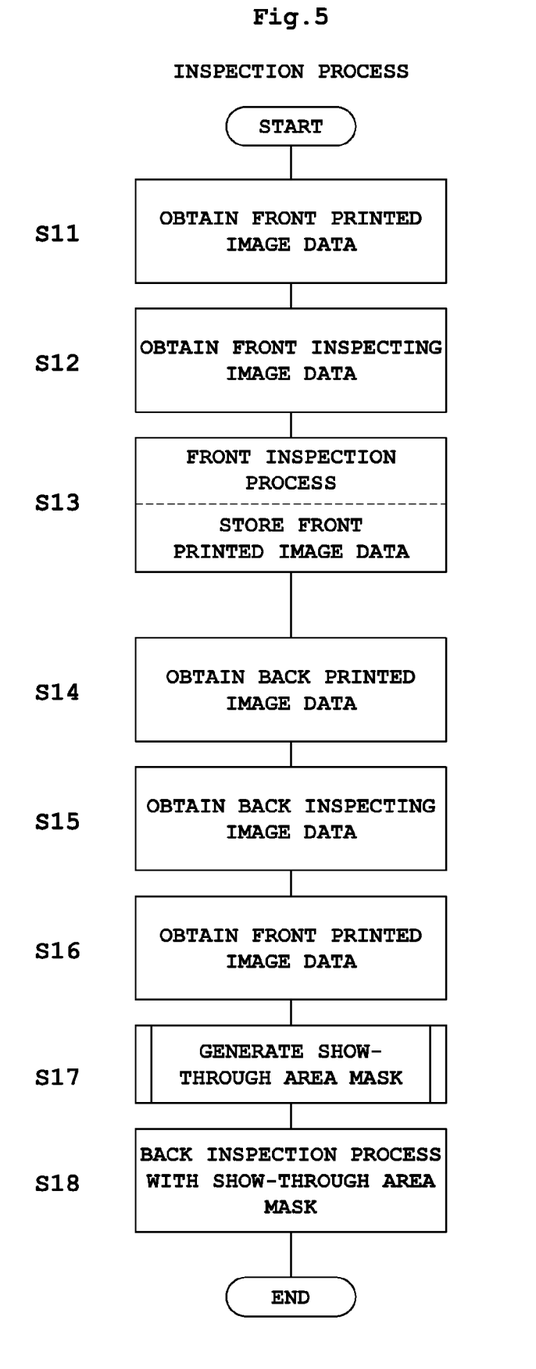
FIG. 5 is a flow chart entirely illustrating inspection process.

Subsequently, description will be given of inspecting the web paper WP in the inkjet printing system with reference to FIG. 5. FIG. 5 is a flow chart of the entire inspection process. Description is to be given hereinunder of only the inspection process, and description of the printing process is to be omitted. Here, the web paper WP is fed successively under control of the controller 31, and a given portion thereof (sheet) of the web paper WP is printed in accordance with the front printed image data FPD. Then the front face of the web paper WP is inspected. Thereafter, the back face as an opposite face of the sheet is printed in accordance with the back printed image data BPD, and the back face is inspected. Such process is to be performed.

Steps S11 to S13

The controller 31 obtains and stores the front printed image data FPD for printing from the external computer (Step S11). The front-face inspecting unit 17 images a given sheet of the web paper WP to obtain the front inspecting image data FID as the result (Step S12). Then the determining unit 39 inspects the front face with the normal inspection threshold NSL in the memory unit 33 (Step S13). When it is found from the inspection that the front-face printing has some error, the error is outputted to the notification unit 35. Here, the received front printed image data FPD is not abandoned but is stored since it is to be used in the following process.

Step S14

The controller 31 obtains the back printed image data BPD for printing from the external computer.

Step S15 (Data Obtaining Process)

The controller 31 images the given sheet of the web paper WP by the back-face inspecting unit 25 to obtain the back inspecting image data FID as the result.

Step S16

The controller 31 reads out the stored front printed image data FPD.

Step S17 (Mask Generating Step)

The mask generating unit 37 generates the show-through area mask BM1 by the show-through area mask generating step illustrated in FIG. 4.

Step S18 (Determining Step)

The determining unit 39 inspects the back inspecting image data FID. Specifically, inspection is performed to the show-through area within the show-through area mask BM1 with the show-through inspection threshold BSL. Moreover, inspection is performed to the area other than the show-through outside the show-through area mask BM1 with the normal inspection threshold NSL. When it is found from the inspection that the front-face printing has some error, the error is outputted to the notification unit 35.

With the embodiment as mentioned above, the mask generating unit 37 generates the show-through area mask BM1 in accordance with the inverted front printed image data FPD1 and the back printed image data BPD, the inverted front printed image data FPD1 being obtained by inverting the front printed image data FPD in the horizontal direction. The show-through area mask BM1 represents an area where the show-through of the printed image of the front printed image data FPD possibly exists on the back face of the web paper WP. The determining unit 39 inspects the show-through area of the back inspecting image data BID, corresponding to the show-through area mask BM1, with the show-through inspection threshold BSL, and inspects an area outside the show-through area mask BM1 with the normal threshold NSL tighter than the show-through inspection threshold BSL. Consequently, the area where the show-through possibly exists with high possibility is inspected with the looser show-through inspection threshold BSL. This achieves suppression of determination error due to the show-through. On the other hand, the area where no show-through possibly exists with high possibility is inspected with the tight normal inspection threshold NSL. This achieves accurate determination of the printing error. As a result, accurate printing inspection is obtainable even to the web paper WP with the show-through.

The mask generating unit 37 generates the show-through area mask BM1 without using the front and back inspection image data FID and BID via the optical system. Accordingly, almost no error occurs due to distortion of the optical system, and thus accurate front and back alignment is obtainable. Consequently, the show-through area in the show-through area mask BM1 can be set accurately.

Moreover, the mask generating unit 37 performs the thickening process to the pure show-through area mask, and the result mask is adopted as the show-through area mask. In the double-faced printing, slight deviation may occur between the front and back faces of the printing sheet. Then, the thickening process is performed, achieving absorption of the deviation.

The present invention is not limited to the foregoing examples, but may be modified as follows.

(1) In the embodiment mentioned above, the areas inside and outside the show-through area are simultaneously inspected. Alternatively, the entire back inspecting image data FID is inspected with the normal inspection threshold NSL, and then the show-through area mask BM1 is applied to an area found to be an error, and the area is inspected again with the show-through inspection threshold BSL. Thereafter, misinformation generated with the normal inspection threshold NSL is removed. Such inspection in two stages may be performed.

(2) The embodiment mentioned above has been described taking the inspection in the inkjet printing as one example. The present invention, however, is not limited to such a printing mode. For instance, the present invention is applicable to inspection to a printing sheet with show-through of a front image being transparent to the back face after double-faced printing is performed.

(3) In the embodiment mentioned above, the thickening process is performed to the pure show-through area mask BM, and the resultant is adopted as the show-through area mask BM1. When printing is performed with highly accurate front and back alignment, the pure show-through area mask BM is adoptable without performing the thickening process. This achieves suppressed load and increased inspection speeds.

(4) The embodiment mentioned above has exemplified inspection of a printed matter printed to the web paper WP. The present invention is also applicable to inspection of a printed matter printed to a paper sheet.

(5) In the embodiment mentioned above, the mask generating step (Step S17) is performed after the data obtaining step (Step S15). The mask generating step may be performed prior to the data obtaining step such that the show-through area mask BM1 is previously generated upon receiving the back printed image data BPD from the external computer.

INDUSTRIAL APPLICABILITY

As noted above, the present invention is suitable for a printed image inspecting apparatus and a printed image inspecting method for inspecting a double-faced printing sheet.

REFERENCE SIGN LIST

WP . . . web paper
1 . . . paper feeder
3 . . . inkjet printing apparatus
5 . . . take-up roller
13 . . . front-face printing unit
17 . . . front-face inspecting unit
19 . . . inversion unit
21 . . . back-face printing unit
25 . . . back-face inspecting unit
27, 29 . . . printing head
31 . . . controller
33 . . . memory unit
35 . . . notification unit
37 . . . mask generating unit
39 . . . determining unit
NSL . . . normal inspection threshold
BSL . . . show-through inspection threshold
FPD . . . front printed image data
BPD . . . back printed image data
FID . . . front inspecting image data
BID . . . back inspecting image data
FPD1 . . . inverted front printed image data
BM . . . pure show-through area mask
BM1 . . . show-through area mask

What is claimed is:

1. A printed image inspecting apparatus for reading out an image printed on a printing sheet in accordance with printed image data and inspecting a printing result on the printing sheet, the printed image inspecting apparatus comprising:
a reader configured to read front and back faces of the printing sheet to obtain front inspecting image data and back inspecting image data, respectively;
a mask generating unit configured to generate a show-through area mask, representing an area where show-through possibly exists, in accordance with inverted front printed image data of the printed image data and the back printed image data of the printed image data, the inverted front printed image data being obtained by inverting the front printed image data in a horizontal direction; and
a determining unit configured to inspect the back printed image data and the back inspecting image data of a show-through area corresponding to the show-through area mask with a show-through inspection threshold, and to inspect the front printed image data and the front inspecting image data as well as the back printed image data and the back inspecting image data of an area other than the show-through area with a normal inspection threshold.

2. The printed image inspecting apparatus according to claim 1, wherein the mask generating unit generates the show-through area mask by aligning the inverted front printed image data with the back printed image data.

3. The printed image inspecting apparatus according to claim 2, wherein
the mask generating unit generates a pure show-through area mask by removing an image area of the back printed image data from inverted front printed image data, and thickening process is performed to the pure show-through area mask, and a resultant mask is adopted as the show-through area mask.

4. The printed image inspecting apparatus according to claim 1, wherein the determining unit inspects the entire back inspecting image with the normal inspection threshold, and then the show-through area mask is applied to an area found to be an error, thereby inspecting the area again with the show-through inspection threshold.

5. The printed image inspecting apparatus according to claim 1, wherein the determination unit adopts the show-through inspection threshold looser than the normal inspection threshold.

6. A printed image inspecting method for reading out an image printed on a printing sheet in accordance with printed image data and inspecting a printing result on the printing sheet, the printed image inspecting method comprising:
a data obtaining step of reading a back face of the printing sheet after printing a front face of the printing sheet in accordance with front printed image data and after printing the back face of the printing sheet in accordance with back printed image data, thereby obtaining back inspecting image data;
a mask generating step of generating a show-through area mask, representing an area where show-through possibly exists, in accordance with inverted front printed image data of the printed image data and the back printed image data of the printed image data, the inverted front printed image data being obtained by inverting the front printed image data in a horizontal direction; and
a determining step of inspecting the back printed image data and the back inspecting image data of a show-through area, corresponding to the show-through area mask, with a show-through inspection threshold, and inspecting the front printed image data and the front inspecting image data as well as the back printed image data and the back inspecting image data of an area other than the show-through area with a normal inspection threshold.

7. The printed image inspecting method according to claim 6, wherein the mask generating step includes aligning the inverted front printed image data with the back printed image data to generate the show-through area mask.

8. The printed image inspecting method according to claim 7, wherein
the mask generating step includes removing an image area in the back printed image data from the inverted front printed image data to generate a pure show-through area mask, and then performing thickening process to expand the pure show-through area mask outwardly, and a resultant mask is adopted as the show-through area mask.

9. The printed image inspecting method according to claim 6, wherein the determining step is performed by inspecting the entire back inspecting image with the normal inspection threshold, and then applying the show-through area mask to an area found to be an error, thereby inspecting the area again with the show-through inspection threshold.

10. The printed image inspecting apparatus according to claim 6, wherein the show-through inspection threshold in the determining step is looser than the normal inspection threshold.

* * * * *